Dec. 31, 1935.   J. G. BLUNT   2,025,931
LATERAL MOTION DAMPENING DEVICE FOR LOCOMOTIVES
Filed Nov. 19, 1932   5 Sheets-Sheet 1
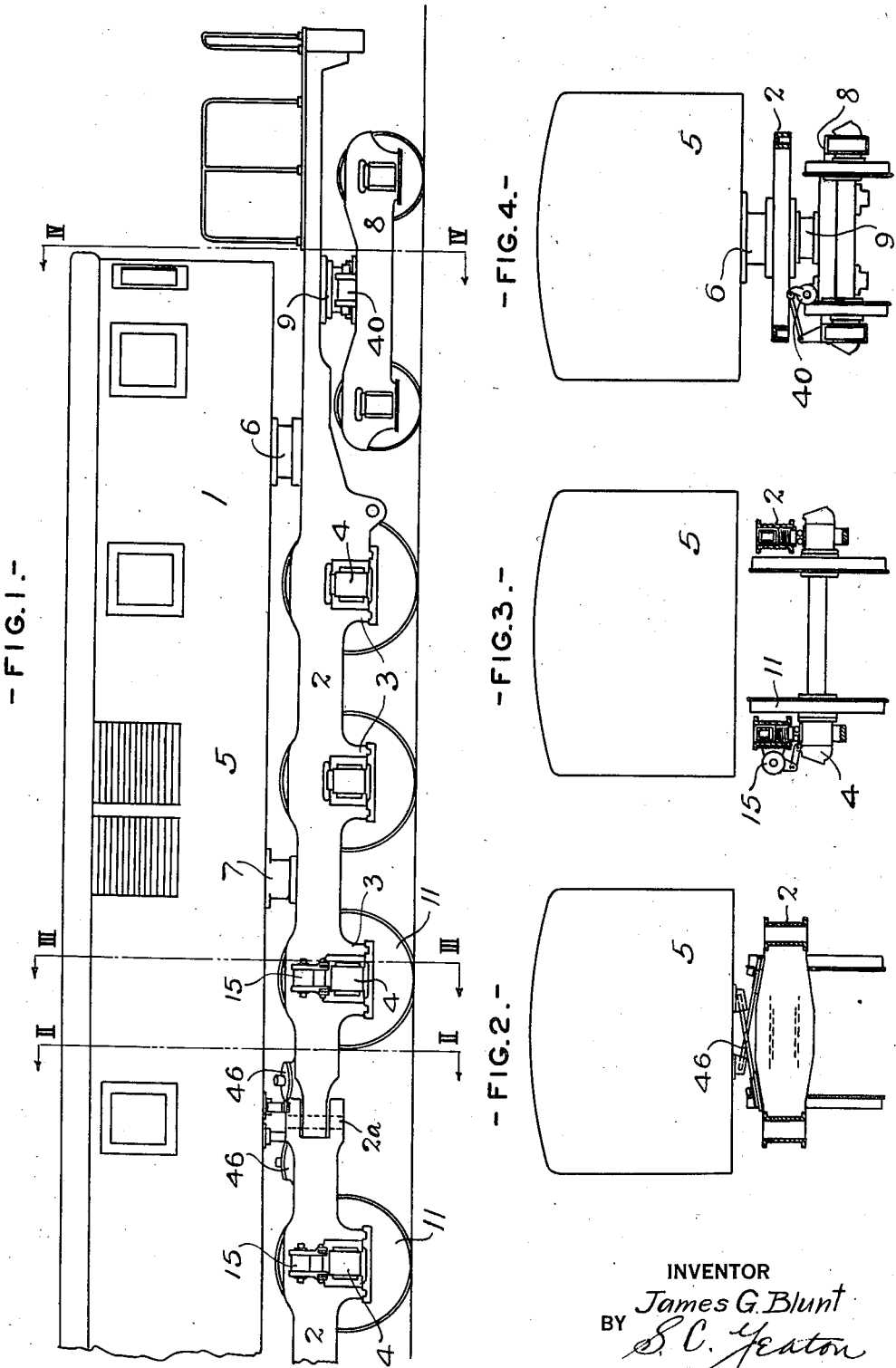
INVENTOR
James G. Blunt
BY S. C. Yeaton
ATTORNEY

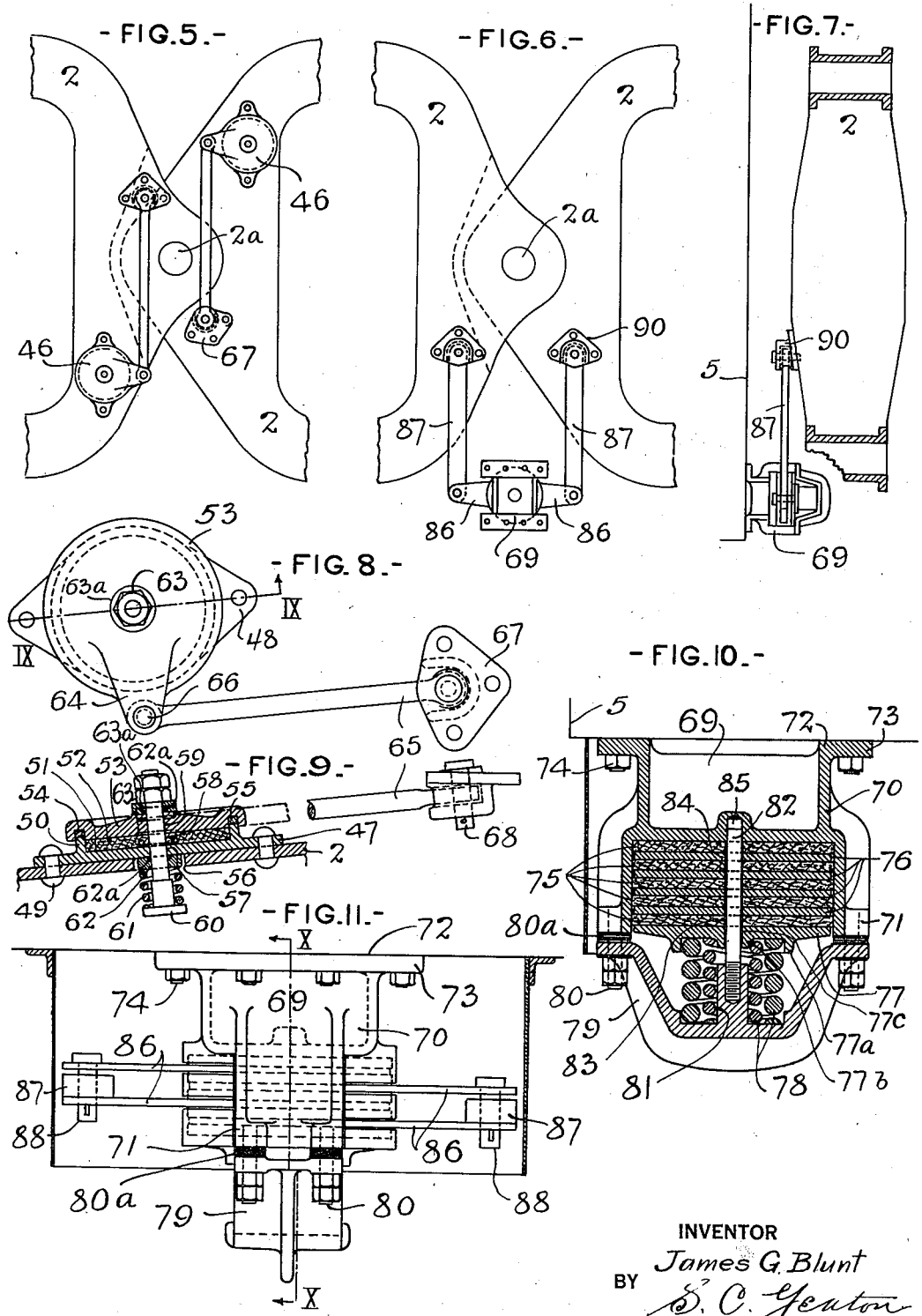

Dec. 31, 1935.  J. G. BLUNT  2,025,931
LATERAL MOTION DAMPENING DEVICE FOR LOCOMOTIVES
Filed Nov. 19, 1932    5 Sheets-Sheet 3
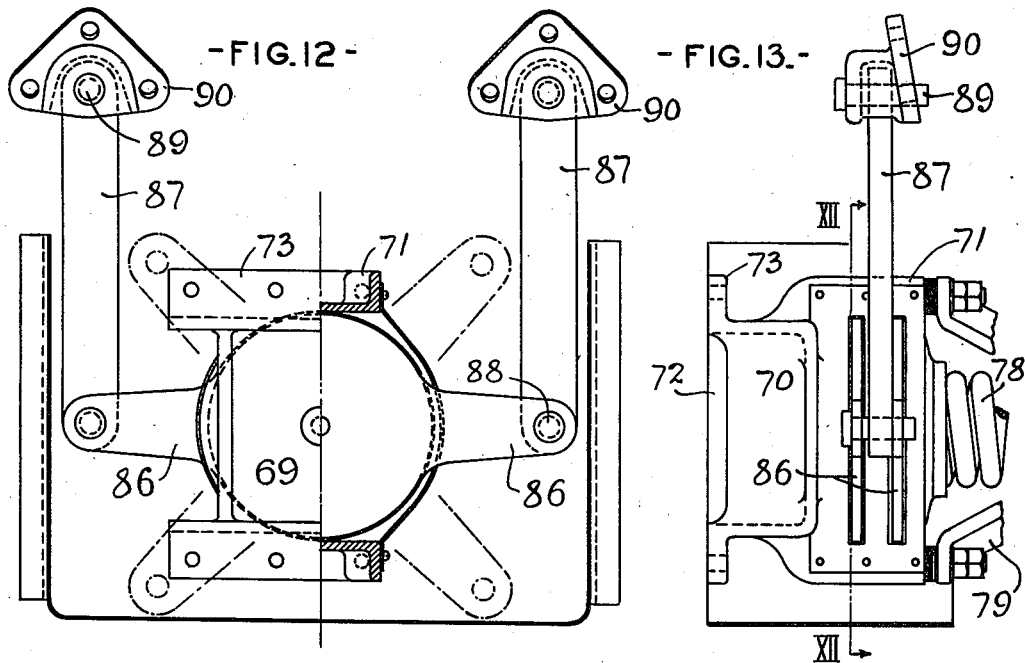
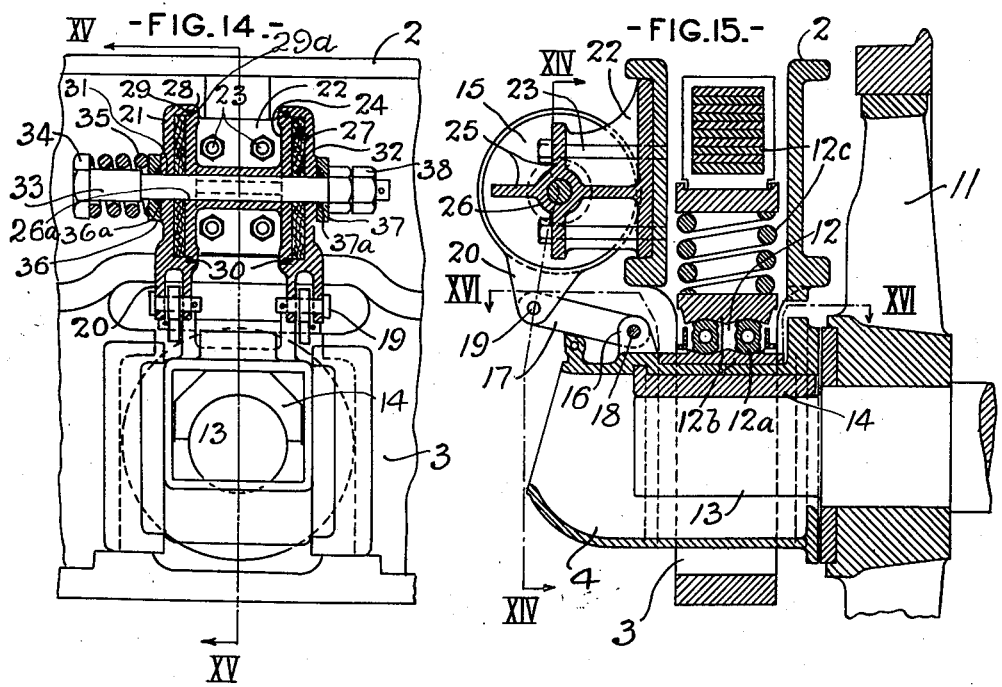
INVENTOR
James G. Blunt
BY S. C. Yeaton
ATTORNEY Dec. 31, 1935.                J. G. BLUNT                    2,025,931
               LATERAL MOTION DAMPENING DEVICE FOR LOCOMOTIVES
                       Filed Nov. 19, 1932         5 Sheets-Sheet 4
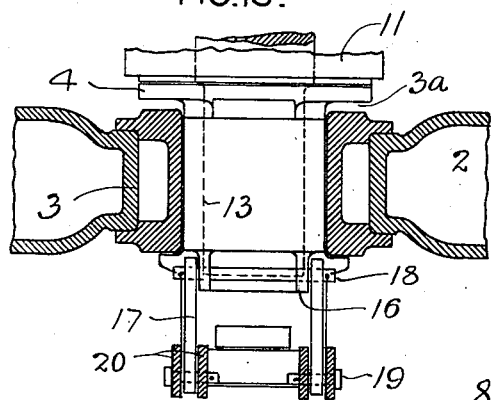
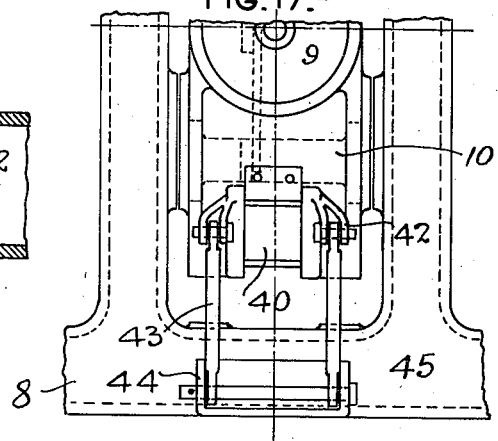
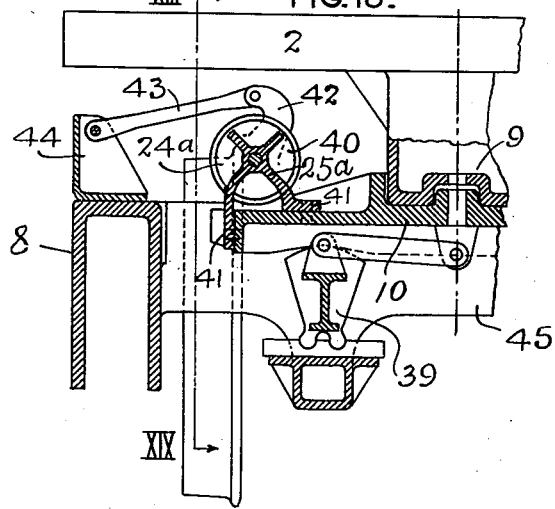
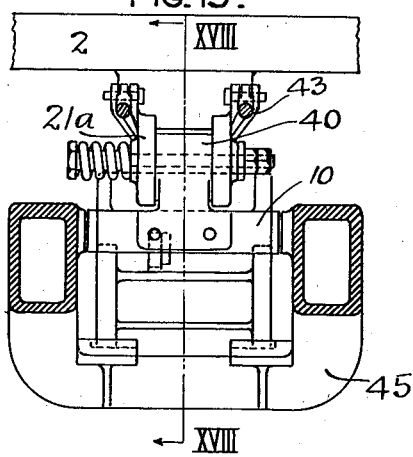
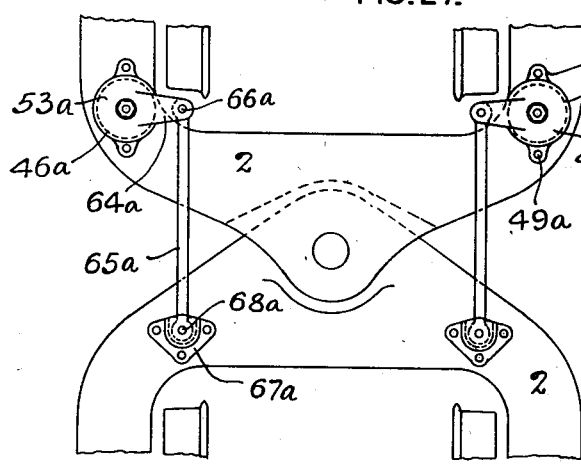
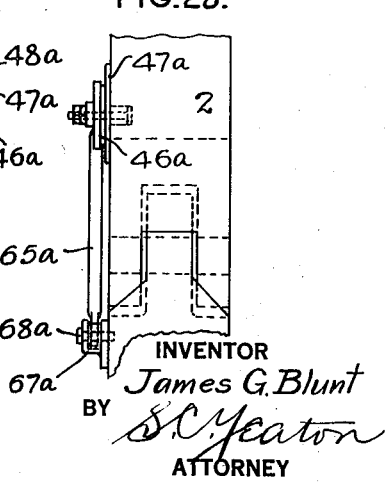
INVENTOR
James G. Blunt
BY
S. C. Yeaton
ATTORNEY Dec. 31, 1935. J. G. BLUNT 2,025,931
LATERAL MOTION DAMPENING DEVICE FOR LOCOMOTIVES
Filed Nov. 19, 1932 5 Sheets-Sheet 5
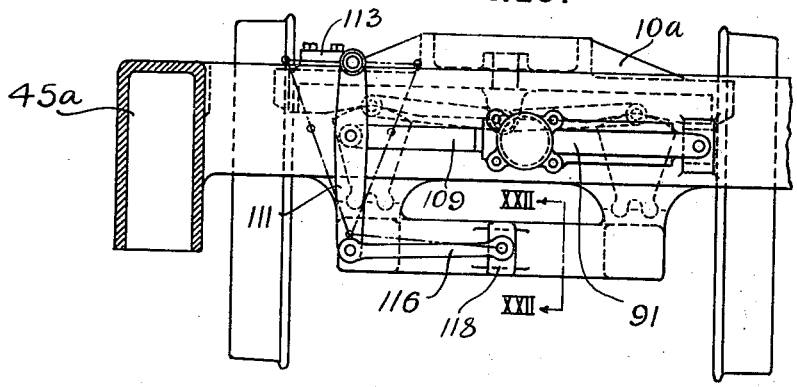
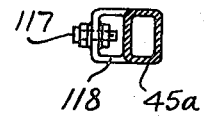
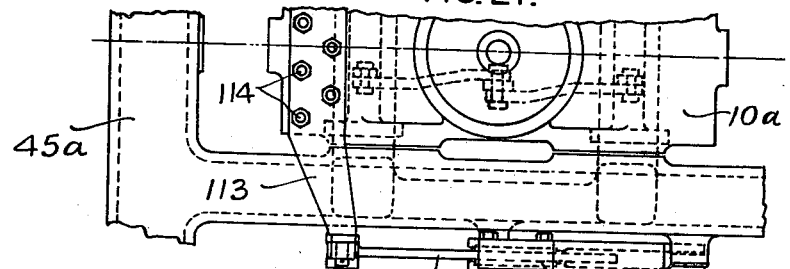
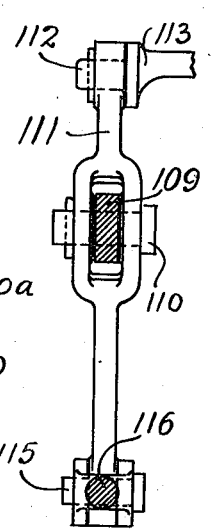
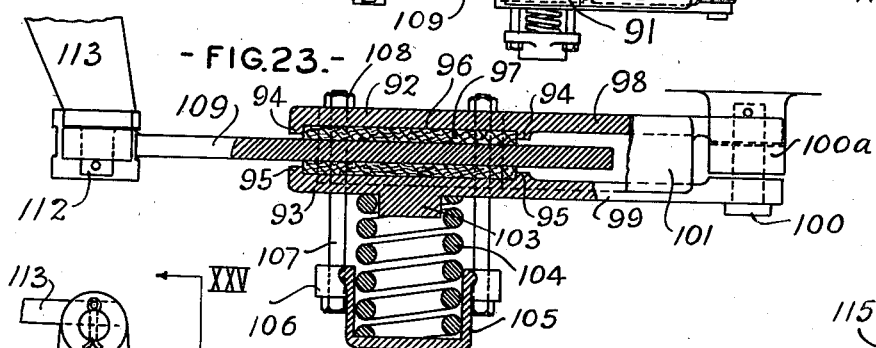
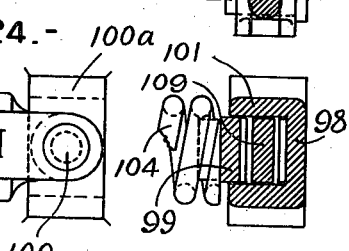
INVENTOR
James G. Blunt
BY
S. C. Yeaton
ATTORNEY Patented Dec. 31, 1935

2,025,931

UNITED STATES PATENT OFFICE 2,025,931

LATERAL MOTION DAMPENING DEVICE FOR LOCOMOTIVES

James G. Blunt, Schenectady, N. Y.

Application November 19, 1932, Serial No. 643,381

11 Claims. (Cl. 105—175)

This invention relates to railway vehicles, and particularly to vehicles such as electric locomotives.

An object of the present invention is to provide means for dampening, that is for reducing or neutralizing, lateral vibratory movements of the vehicle superstructure relative to its frame structure, which movements are caused by deflections, such as curves, in the track over which the vehicle passes.

A further object is to provide means for steadying the necessary lateral movements of the vehicle superstructure relative to its frame structure, when the vehicle is entering or leaving curved sections of track, so as to thereby reduce the shocks produced by such deflections.

A still further object is to dampen the relative lateral movements within the frame structure of the vehicle.

Other objects and advantages achieved by the present invention will be apparent from the description of embodiments thereof hereinafter set forth.

As is well known in the art, in a vehicle comprising a plurality of frame units, when the vehicle is traveling at a high speed through curved track, lateral shocks are caused by the deflection of the vehicle frame units, which follow the tracks, relative to the superstructure, these shocks being transferred to the superstructure and resulting in bad riding qualities with consequent discomfort to the crew. These lateral movements are of such character that upon the passing and leaving of curves by the vehicle, rythmic lateral vibrations are produced, adding to the bad riding qualities. The lateral movements likewise produce objectionable shocks on the frame structure and tracks, as well as undue wear on the hub faces and tire flanges of the wheels.

While a limited amount of wear will necessarily result from the relative movements of the vehicle parts caused by deflections in the track, the present invention provides means which will readily permit the vehicle parts to make the necessary relative movements when passing over deflections in the track, but which will cause the relatively moving parts to move against a yielding resistance and steadying means so as to prevent lateral vibration and dampen, that is neutralize or reduce, the objectionable shocks and lateral vibrations and minimize the amount of wear resulting from such movements.

The invention is illustrated in the accompanying drawings wherein, Figure 1 is a diagrammatic side elevation of a part of an electric locomotive with the present invention applied thereto; Fig. 2 is a section on the line II—II of Fig. 1, showing dampening devices of the present invention connected to the main frames and the superstructure; Fig. 3 is a section on the line III—III of Fig. 1, showing a dampening device of the present invention connected to a main frame and a journal box; Fig. 4 is a section on the line IV—IV of Fig. 1, showing a dampening device of the present invention connected to an end truck frame and its bolster; Fig. 5 is a plan view on an enlarged scale of the dampening devices shown in Fig. 2, the main frames being shown only in part; Fig. 6 is a plan view of a modified form of the dampening device applied to the articulated main frames, the frames being shown only in part; Fig. 7 is an end view of the device shown in Fig. 6, the superstructure being merely indicated and a main frame being shown in broken section with the device connected to the main frame and superstructure; Fig. 8 is a plan view, on an enlarged scale, of one of the dampening devices shown in Fig. 5; Fig. 9 on the left side is a section on the line IX—IX of Fig. 8 and on the right side the broken away portion is an elevation; Fig. 10 is a sectional view on the line X—X of Fig. 11; Fig. 11 is a side elevation, on an enlarged scale, of the device shown in Fig. 6; Fig. 12 is a view of the device shown in Fig. 11, the left half a plan view and the right half a section on the line XII—XII of Fig. 13; Fig. 13 is an end view of the device shown in Fig. 11; Fig. 14 is a longitudinal section, on an enlarged scale, of the dampening device and associated parts shown in Fig. 3, on the line XIV—XIV of Fig. 15; Fig. 15 is a transverse section on the line XV—XV of Fig. 14; Fig. 16 is a section on the line XVI—XVI of Fig. 15; Fig. 17 is a plan view, on an enlarged scale, of the dampening device and associated parts shown in Fig. 4; Fig. 18 is a section of the parts shown in Fig. 17, on the line XVIII—XVIII of Fig. 19; Fig. 19 is a section on the line XIX—XIX of Fig. 18; Fig. 20 to 26 are views of a modified form of the dampening device of Fig. 4, Fig. 20 being a fragmentary end view, partly in section, of the modified form of dampening device and associated parts, Fig. 21 a fragmentary plan view of the parts shown in Fig. 20, Fig. 22 a section on the line XXII—XXII of Fig. 20, Fig. 23 an enlarged view of the dampening device of Fig. 20, a part being in section on the line XXIII—XXIII of Fig. 24 and the remainder being a plan view, Fig. 24 an end view of the dampening device of Fig. 23, Fig. 25 a section on the line XXV—XXV of Fig. 24, and Fig. 26 a section on the line XXVI—XXVI of Fig. 24;

Fig. 27 is a plan view on a reduced scale of dampening devices, each of which is similar to the device illustrated in Figs. 8 and 9, applied to the articulated main frames, the frames being shown only in part; and Fig. 28 is a side view of one of the devices and its associated parts of Fig. 27.

An end portion of an electric locomotive embodying the present invention and indicated generally by the numeral 1 is illustrated in Fig. 1. The locomotive comprises two main frames 2 articulated by a pin 2a in the usual manner. Each of the main frames 2 comprises a plurality of pedestal jaws 3 arranged in tandem on opposite sides of the locomotive, and journal boxes 4 are held within the pedestal jaws in the usual manner. A superstructure 5, embodying a cab containing operating equipment (not shown), is supported on each of the main frames at three points. Each of the main frames and its adjacent connected parts at the opposite ends of the locomotive being of identical construction, for the purpose of brevity of description only one end of the locomotive will be hereinafter described.

The three points of support for the superstructure on the main frame 2 at the end of the locomotive which will hereinafter be described, comprise a center bearing 6 located on the longitudinal center line of the vehicle, and the side bearings 7 located one on each side of the main frame, and are of usual construction. When passing through curved track the superstructure revolves on the center bearing and slides on the side bearings. This main frame 2 is supported at its outer end on an end truck 8, through a center bearing 9 and a truck bolster 10, the bolster being supported on lateral centering means to permit lateral movement of the end truck relative to the main frame in the usual manner.

When the vehicle is passing through curved track and the end truck is deflected relative to its main frame, the main frame swivels on the center bearing 6, assuming an angular relation to the main frame at the other end of the locomotive. To compensate for this, the center bearing 6 is designed so as to be slidable longitudinally. The center bearing on the other main frame is of course not longitudinally slidable, it being necessary for only one of the main frames to have this longitudinal compensating movement. Further, the connection of the end truck 8 with the main frame tends to deflect the outer end of the main frame toward the inside of the curve in a rotary direction with relation to the center bearing 6, the deflection of the main frame at its inner end being consequently in the opposite direction or toward the outside of the curve. The driving wheels 11, which are the driving wheels nearest the articulation point connecting the two main frames of the locomotive together, being the furthest distance from the center bearing 6, thus are nearest the place of the greatest deflection, and the present invention provides dampening means for the lateral vibratory movement at this location, that is, in connection with these driving wheels where these maximum lateral movements are present.

Each of the journal boxes 4 of the driving wheels 11 is provided with a geared roller lateral resistance or centering device indicated generally by the numeral 12, as clearly shown in Fig. 15.

Each centering device 12 comprises upper and lower roller seats 12b having inclined surfaces with rollers 12a interposed between the seats, the lower roller seat being secured to the journal box and the upper roller seat being in engagement with the main frame 2 in the usual manner, with springs 12c of the ordinary type interposed between the frame and the upper seat. The flanges of these journal boxes engaging the pedestals are proportioned to provide a space at their inner sides as shown at 3a (Fig. 16) so as to permit outward movement only of the journal boxes relative to the pedestals. The driving axle journals 13 of the wheels 11 are collarless and free to slide laterally under their bearings 14. When an axle journal and its adjacent wheel moves outwardly with relation to the main frame its journal box and its lower roller seat are laterally displaced outwardly with relation to the upper roller seat and the rollers are forced onto the inclines, and by reason of the tendency of the rollers to return to the bottoms of the inclines the parts are urged back to their normal positions. The lateral centering devices 12 are of similar construction to that described in my copending United States application Serial No. 601,931, filed March 30, 1932, and further details of the construction of this device will therefore, not be included herein, but may be ascertained by reference to the aforesaid application. It will be understood, however, that while a particular construction of lateral centering device is herein illustrated, the present invention is not to be considered as restricted thereto but contemplates the use of any of the various well-known types of centering devices which are suitable, for instance see United States Patent 1,482,109, issued to me January 29, 1924.

A dampening device, indicated generally by the numeral 15, is applied to each of the journal boxes of the driving wheels 11, which are the driving wheels nearest the articulation connecting the main frames 2 (see Figs. 3, 14, 15 and 16). The dampening devices 15 are of identical construction and arrangement, and for the purpose of brevity only one device will be described, and only one device is shown in Fig. 3.

Two spaced lugs 16 are formed on the top of the journal box 4 of the wheel 11 to which the device is applied. Two links 17 are connected, one to each of said lugs, a pin 18 being passed through each of said lugs and through an end of its respective link providing a pivotal connection. The links 17 extend laterally outwardly from the lugs and each link is pivotally connected at its outer end by a pin 19 to one of two jaws 20 which are formed, one on each of two oppositely disposed rotatable discs 21. A bracket 22 is secured by studs 23 to the outside of the adjacent main frame 2 above the journal box 4 to which the device is applied. Two oppositely disposed circular fixed discs 24 are formed integrally with the bracket 22, the outer surface of each of the discs 24 facing the inner surface of one of the rotatable discs 21. The fixed discs 24 are connected by integrally formed transverse webs 25 and a sleeve 26. Two friction discs 27 are disposed one between the outer surface of each of the discs 24 and the inner surface of its adjacent disc 21.

Each of the rotatable discs 21 is provided with an inwardly extending peripheral flange 28 which overlaps the periphery of its adjacent friction disc 27 and adjacent its fixed disc 24. A groove 29 is formed in the inner surface of the flange 28 adjacent the outer periphery of its respective disc 24, and a corresponding groove 29a is provided at the outside of the outer periphery of said disc 24, providing a space in which a packing strip 30 is disposed, there being thus provided a tight contact whereby oil, dirt, moisture and the like are excluded from the surfaces of the friction disc. While this packing is desirable in some instances, it is not essential.

Orifices 31 and 32 are centrally formed in the rotatable discs 21 and the friction discs 27, respectively, in alignment with the sleeve 26, and each of the discs 24 is provided with a central orifice 26a opposite the respective end of the sleeve. A bolt 33 is passed through the sleeve and orifices. The bolt 33 is provided with a head 34, and a helical spring 35 is disposed around the bolt between the head and the adjacent rotary disc 21.

A washer 36 is disposed around the bolt between the inner end of the spring and the opposing face of the adjacent disc 21, and a washer 37 and nuts 38 are provided at the opposite end of the bolt adjacent the outer surface of the adjacent disc 21, the head of the bolt being drawn by the nuts against the spring and the spring being held under tension thereby so that the rotary discs 21, the fixed discs 24 and the friction discs 27 are held in tight engagement under tension, which tension is capable of adjustment. The washers 36 and 37 are respectively provided with annular grooves 36a and 37a at their inner faces around the openings through which the bolt 33 is passed, and suitable packing is disposed in said grooves to provide a tight fit.

Each of the jaws 20 is sufficiently wide to provide a clearance between its inner surface and the adjacent outer surface of the link 17 which is connected thereto, to allow any wear of the friction discs 27 to be taken up by inward movement of the discs 21 on which the jaws are formed.

The construction and function of the dampening device 15 is somewhat similar to that described in my United States Patent 1,907,485, dated May 9, 1933. In the patent however the dampening device is used in connection with reversing gear, while in the instant invention it is utilized, with the hereinbefore described lateral resistance or centering device, to dampen lateral movements and vibrations between a driving box and main frame of the locomotive. The employment of the dampening device in this instance, in combination with a lateral resistance or centering device, provides not only further resistance to lateral outward movement but also dampens the return or centering movement.

The end truck 8 is provided with a bolster 10 which is arranged in the usual manner to move laterally with respect to the truck frame, which movement is resisted by rockers 39 in the usual manner (see Figs. 4 and 17 to 19). Such bolster constructions are well known in the art, see for instance that described and illustrated in United States Patent 1,828,002, issued to J. C. Travilla, Jr., on October 20, 1931. In order to steady this lateral movement of the bolster relative to the truck frame and to retard any sudden movements, as well as to overcome lateral vibration, a friction or dampening device indicated generally by the numeral 40, is applied to the bolster and truck frame. The dampening device 40 is of a design similar to the device 15 hereinbefore described, excepting that the device 40 comprises brackets 41 which are formed integrally with transverse webs 25a between fixed discs 24a, and the brackets 41 are suitably bolted to the bolster 10 to which the device is applied. Also, for the device 40, rotatable discs 21a are provided, with integrally cast arms 42, and by means of pivotally connected links 43 the arms are connected to a suitable bracket 44 welded to the truck frame 45.

While the dampening devices 15 and 40 act to dampen lateral movements, as hereinbefore set forth, as a further precaution for preventing the transmission of shocks to the superstructure, dampening means are provided between the main frames 2 and the superstructure. The present invention provides such means by applying a lateral motion dampening device, indicated generally by the numeral 46, adjacent the articulation point between the two main frames 2 (see Figs. 1, 2, 5, 8 and 9). Both ends of the locomotive being of similar construction as hereinbefore stated, there will of course be one dampening device 46 on each of the opposite sides of the pin 2a. The device 46 is secured to the main frame 2 and the superstructure 1. While this device is similar in general structure and operation to the device 15, it comprises modified structural details, including a fixed disc 47 having a pair of outwardly extending ears 48 which are secured to the main frame 2 by rivets 49. A circular upstanding flange 50 is formed on the disc 47, providing a pocket 51 in which a circular friction disc 52 is disposed. A rotatable disc 53 is provided over the friction disc 52, its outer edge overlapping the flange 50 and being provided with an annular groove 54 in which a packing strip 55 is disposed. The upper edge of the flange 50 extends slightly into the groove 54 against the packing so that a tight contact is provided, shielding the friction disc from oil, dirt, moisture and the like. A circular opening 56 is provided in the main frame 2 opposite the center of the fixed disc 47 and coresponding openings 57, 58 and 59, of smaller diameter than the opening 56, are formed in the fixed disc, the friction disc and rotatable disc respectively. A headed bolt 60 is passed through these openings, and a helical spring 61 is disposed around the bolt 60 between its head and the fixed disc. A suitable washer 62 is provided between the end of the spring and the fixed disc within the opening 56 and by means of nuts 63 and a suitable washer 63a on the opposite end of the bolt the spring is drawn up so as to effect a resilient engagement of the fixed disc, friction disc and rotatab'e disc. The washers 62 and 63a are both provided with annular grooves 62a at their inner faces around the bolt 60 and suitable packing is disposed within the grooves to provide a seal. The rotatable disc 53 is provided with an outwardly extending arm 64 to which a rod 65 is pivotally connected at one of its ends by a pin 66. The opposite end of the rod 65 is pivotally connected in a pocket 67 by means of a pin 68, and the pocket is suitably bolted to the locomotive superstructure 1.

Referring to Figs. 6, 7 and 10 to 13 inclusive, there is here illustrated a modified form of the lateral motion dampening device 46 shown in Figs. 5, 8 and 9, indicated generally by the numeral 69. One device 69 may be substituted for the two devices 46, at the opposite sides of the pin 2a on the two main frames. The device 69 comprises a housing 70 having yoke supporting members 71 and a base 72 provided with outwardly extending flanges 73. The housing 70 is secured to the superstructure by bolts 74 passing through the flanges 73 and the adjacent part of the superstructure. A plurality of friction discs 75 are disposed between the members 71 and are spaced from each other by rotatable discs 76 disposed therebetween, four discs 76 being employed. A retaining disc 77 is disposed against the outermost friction disc and is resiliently held thereagainst by means of two helical springs 78 which are held under tension against disc 77 by means of a transverse retaining yoke 79 suitably secured to the outer ends of the members 71 by bolts 80, shims 80a being provided between the yoke and the members 71 so that wear of the friction discs may be readily taken up. The retaining yoke 79 is provided with an inwardly extending stem 81 around which the springs 78 are disposed, the springs being thereby held in position. Circular flanges 77a and 77b are formed on the outer face of the disc 77 providing a pocket into which the inner ends of the springs extend for holding the springs in position at this end. An elongated stud 82 is screwed into the stem 81 and extends inwardly therefrom through openings 77c, 83 and 84 formed in the retaining disc, friction discs and rotatable discs respectively, and the inner end of the stud extends into a socket 85 formed in a plate for supporting the discs in the bottom of the housing 70, which plate is of the same shape and diameter as the discs, the discs being thereby held in proper adjustment.

The four rotatable discs 76 are provided each with an integrally formed outwardly extending arm 86. Two of the arms extend through slots formed in the housing on each of the opposite sides of the housing. A rigid connecting rod 87 is pivotally connected by a pin 88 to the two arms 86 on each side of the housing and the rod extends inwardly transversely of the locomotive and is pivotally connected by a pin 89 at its inner end to a pocket 90. Each pocket 90 is suitably secured to an adjacent main frame 2 as shown in Fig. 6. It will be apparent that upon relative movement of the two connected main frames the connecting rods 87 will be longitudinally moved so as to turn their respective rotary discs 76, which rotation will be restricted by means of the friction discs against which the rotary discs are held under compression.

Referring to Figs. 20 to 26, there is here illustrated a modified form of a lateral motion dampening device indicated generally by the numeral 91 which may be substituted for the device 40 shown in Fig. 4. The device 91 comprises oppositely disposed retaining members 92 and 93, each of which is provided with inwardly extending flanges 94 and 95 respectively providing a pocket 96 in which a friction element 97 is disposed. The members 92 and 93 are provided with longitudinal extensions 98 and 99 respectively which are pivotally connected at their outer ends by a pin 100 to a lug 100a formed on the truck frame 45a. The member 92 is provided with laterally extending side members 101 which overlap the member 93 and act to hold the members 92 and 93 against relative lateral displacement. Outwardly extending ears 102 are formed two on each of the opposite sides of the member 92 each ear being provided with a bolt hole. The member 93 is provided with a circular projection 103, and a helical spring 104 at its inner end engages the member 93 around the projection 103. The outer end of the spring is provided with a cap 105 on which are formed ears 106 each having a bolt hole formed therein, corresponding to the ears 102. Bolts 107 are passed through the corresponding holes in the ears 102 and 106 and the bolts are provided with nuts 108 at their opposite ends, the cap 105 being held thereby under compression against the spring and the members 92 and 93 and the opposite friction elements 97 being thus resiliently forced toward each other. A longitudinally sliding friction bar 109 is disposed between the opposite friction elements 97 and extends in the opposite direction to the extensions 98 and 99, the extension 98 and its side members 101 providing a channel into which an end of the bar 109 extends. The other end of the bar 109 is pivotally connected by a pin 110 to a vertically disposed lever 111 between the ends of said lever. The lever 111 is pivotally connected at its upper end to a trunnion 112 on an arm 113 which arm is rigidly secured to the truck bolster 10a by bolts 114. The lower end of the lever 111 is pivotally connected by a pin 115 to one end of a horizontally disposed rod 116, and the other end of the rod 116 is pivotally connected by a pin 117 to a lug 118 integrally formed on the truck frame 45a (Fig. 22).

It will thus be apparent that when the frame of this truck and its bolster move laterally with relation to each other, the members 92 and 93 with the friction elements 97 held thereby and the bar 109 will be simultaneously moved relative to each other and friction between the bar 109 and the friction elements will act to resist the relative movement of the bar 109 and the friction elements 97 and consequently to resist relative movement of the bolster and the truck frame, thereby dampening sudden relative movements of these parts and substantially preventing lateral vibration.

Referring to Figs. 27 and 28 there is here illustrated a modified application of dampening devices similar to those described with reference to Figs. 2, 5, 8 and 9. Here dampening devices 46a are provided, one on each side of the vehicle, each device 46a being of the same construction as the device 46. More particularly, the fixed disc 47a of each device 46a is secured to one of the articulated main frames 2 by rivets 49a passed through ears 48a formed on the disc 47a in the same manner as described with reference to the devices 46. Likewise the rotatable disc 53a of the device 46a is provided with an arm 64a to which a rod 65a is pivotally connected at one of its ends by a pin 66a. The rod 65a of each device extends longitudinally of the vehicle and its opposite end is pivotally connected in a pocket 67a by means of a pin 68a, and the pocket is suitably bolted to the adjacent articulated main frame. This arrangement is adapted to resist relative movement of the two main frames pivotally about the point of articulation.

By the application of the lateral motion restraining devices 15, 40 and 46 at their respective positions on the locomotive, or the application of the modified forms thereof, hereinbefore described, in said locations, which are the locations where the lateral shocks caused by track deflections originate, sudden relative lateral movements of the parts are retarded and the several restraining devices act in cooperation with each other preventing rythmic lateral vibration while at the same time softening shocks to the locomotive parts and to the track.

While there have been hereinbefore described certain embodiments of the present invention, it will be understood that many and various changes and modifications in form, structure and arrangement may be made without departing from the spirit of the present invention and that all such changes and modifications are contemplated as a part of the present invention as defined by the appended claims.

The invention claimed and desired to be secured by Letters Patent is:

1. A railway vehicle having a superstructure and a pair of supporting frames pivotally connected to said superstructure to permit swinging lateral movements in either direction of said frames relative to each other and to said superstructure, in combination with a resistance-friction device carried by said superstructure for resisting said relative swinging movements comprising a plurality of pivotally connected members including two members rotatable relative to each other in opposite directions and a friction member between said rotatable members in frictional engagement therewith for resisting their relative rotations, one of said rotatable members being connected with one of said frames and the other of said rotatable members being connected with the other of said frames whereby said rotatable members are relatively rotated in opposite directions against frictional resistance upon said relative swinging movements of said frames in either direction, to reduce shocks imparted to said superstructure from said frames.

2. A railway vehicle having a superstructure and a pair of supporting frames pivotally connected to said superstructure to permit swinging lateral movements in either direction of said frames relative to each other and to said superstructure, in combination with a resistance-friction device for resisting said relative swinging movements comprising a pair of members, one of which is rotatable in opposite directions relative to the other, having frictional engagement to resist said relative rotations, one of said members being connected with one of said frames and the other of said members being connected with the other of said frames whereby said members are relatively rotated against the force of said frictional engagement upon said relative swinging movements of said frames in either direction, to reduce shocks imparted to said superstructure from said frames.

3. A railway vehicle having a supporting frame and a journal box mounted in said frame and adapted for limited lateral movements away from and back to its normal position relative to said frame, in combination with a resistance-friction device comprising a pair of members, one of which is rotatable in opposite directions relative to the other, having frictional engagement to effect resistance throughout all said relative rotations, one of said members being connected with said frame and the other of said members being connected with said box whereby said members are relatively rotated against said resistance upon said lateral movements of said box both away from and back to said normal position, to reduce shocks imparted to said frame from said box.

4. In a locomotive, the combination of a superstructure; a supporting frame for said superstructure adapted for swinging lateral movements away from and back to its normal position relative to said superstructure; a pair of frame-supporting wheels adapted for limited lateral movements away from and back to its normal position relative to said frame; resistance-friction means disposed between said pair of wheels and said frame to effect resistance to all said movements of said pair of wheels both away from and back to its said normal position, to reduce shocks imparted to said frame from said wheels; and resistance-friction means disposed between said frame and said superstructure to effect resistance to all said swinging movements of said frame both away from and back to its said normal position, to reduce shocks imparted to said superstructure from said frame, including those emanating from said pair of wheels and transmitted through said frame.

5. In a locomotive, the combination of a superstructure; a plurality of supporting frames for said superstructure adapted for swinging lateral movements away from and back to their normal positions relative to said superstructure; a pair of frame-supporting wheels for each of said frames, at least one of said pair of wheels being adapted for limited lateral movements away from and back to its normal position relative to its frame; resistance-friction means disposed between said laterally movable pair of wheels and its said frame to effect resistance throughout all said movements of said pair of wheels both away from and back to its said normal position, to reduce shocks imparted to said frame from said laterally movable pair of wheels; and resistance-friction means disposed between said frames and said superstructure to effect resistance to all said swinging movements of said frames both away from and back to their said normal positions, to reduce shocks imparted to said superstructure from said frames, including those emanating from said laterally movable pair of wheels and transmitted through said frame.

6. In a locomotive, the combination of a superstructure; a supporting frame for said superstructure adapted for swinging lateral movements away from and back to its normal position relative to said superstructure; a pair of frame-supporting wheels adapted for limited lateral movements away from and back to its normal position relative to said frame; a truck frame for supporting said superstructure-supporting frame adapted for limited lateral movements away from and back to its normal position relative to said superstructure-supporting frame; resistance-friction means disposed between said truck frame and said superstructure-supporting frame adapted to effect resistance to all said movements of said truck frame both away from and back to its said normal position, to reduce shocks imparted to said superstructure-supporting frame from said truck frame; resistance-friction means disposed between said pair of wheels and said superstructure-supporting frame to effect resistance to all said movements of said pair of wheels both away from and back to its said normal position, to reduce shocks imparted to said superstructure-supporting frame from said pair of wheels; and resistance-friction means disposed between said superstructure-supporting frame and said superstructure to effect resistance to all said swinging movements of said superstructure-supporting frame both away from and back to its said normal position, to reduce shocks imparted to said superstructure from said superstructure-supporting frame, including those emanating from said pair of wheels and transmitted through said superstructure supporting frame and those emanating from said truck frame and transmitted through said superstructure-supporting frame.

7. In a railway vehicle comprising a frame and a journal box mounted in said frame and adapted for limited lateral movements away from its normal position relative to said frame and for return movements back to said normal position, means interposed between said frame and said journal box adapted to resist said lateral movements away from said normal position and to assist said return movements, in combination with resistance-sliding-friction means operably connected with said frame and journal box adapted to resist said lateral movements and said return movements.

8. In a railway vehicle, the combination of a frame member; an axle member carried in said frame member adapted for lateral displacing movements away from and lateral returning movements back to a normal position relative to said frame member; means interposed between said members adapted to transmit weight from said frame member to said axle member and to resist said displacing movements and assist said returning movements by the potential of said weight; and resistance-sliding-friction means engaged with said members adapted to frictionally resist both said displacing movements and said returning movements.

9. In a railway vehicle, the combination of a frame member; an axle having a journal; a housing for said journal carried in said frame member and adapted for lateral displacing movements away from and lateral returning movements back to a normal position relative to said frame member; a lateral motion resisting and centering device interposed between said housing and said frame member adapted to transmit weight from said frame member to said housing and to resist said displacing movements and assist said returning movements by the potential of said weight; and a resistance-sliding-friction device operably engaged with said frame member and said housing adapted for operation against sliding frictional resistance with both said displacing and said returning movements of said housing.

10. In a railway vehicle, the combination of a frame member; an axle having a journal; a housing for said journal carried in said frame member and adapted for lateral displacing movements away from and lateral returning movements back to a normal position relative to said frame member; a lateral motion resisting and centering device interposed between said housing and said frame member adapted to transmit weight from said frame member to said housing and to resist said displacing movements and assist said returning movements by the potential of said weight; and a resistance-sliding-friction device comprising two engaged relatively movable members, one of said engaged members being connected with said frame member and the other of said engaged members being connected with said housing, said engaged members being adapted for relative sliding movements with both said displacing and said returning movements of said housing to frictionally resist all of said housing lateral movements.

11. In a railway vehicle, the combination of a frame member; an axle member carried in said frame member adapted for lateral displacing movements away from and lateral returning movements back to a normal position relative to said frame member; means supported on said axle member and supporting said frame member adapted to effect a raising of said frame member from said axle member with said displacing movements and to permit a lowering of said frame member to its original position with said returning movements whereby said displacing movements are resisted and said returning movements are assisted by the potential of weight transmitted from said frame member to said axle member through said means; and a resistance device operably engaged with said members having parts adapted for relative movement against sliding frictional resistance with all of said lateral movements of said members whereby the potential of all of said movements will be attenuated by said sliding frictional resistance.

JAMES G. BLUNT.